(12) United States Patent
Nagashima

(10) Patent No.: US 7,373,050 B2
(45) Date of Patent: May 13, 2008

(54) OPTICAL COMMUNICATION MODULE AND CONNECTOR

(75) Inventor: Zenya Nagashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 442 days.

(21) Appl. No.: 10/765,752

(22) Filed: Jan. 27, 2004

(65) Prior Publication Data

US 2004/0240797 A1 Dec. 2, 2004

(30) Foreign Application Priority Data

Jan. 29, 2003 (JP) .............................. 2003-020719

(51) Int. Cl.
  *G02B 6/26* (2006.01)
(52) U.S. Cl. .......................................... 385/47; 385/38
(58) Field of Classification Search ................ 385/38, 385/47, 14, 18
  See application file for complete search history.

(56) References Cited

U.S. PATENT DOCUMENTS

| | | | | | |
|---|---|---|---|---|---|
| 4,421,384 | A | * | 12/1983 | McMahon | ...................... 385/4 |
| 4,540,237 | A | * | 9/1985 | Winzer | ......................... 385/47 |
| 5,037,171 | A | * | 8/1991 | Lund et al. | ................... 385/38 |
| 5,082,378 | A | * | 1/1992 | Muller et al. | ................. 385/72 |
| 5,164,588 | A | * | 11/1992 | Marcus | .................. 250/227.21 |
| 5,537,499 | A | * | 7/1996 | Brekke | ......................... 385/31 |
| 5,552,918 | A | * | 9/1996 | Krug et al. | ................. 398/139 |
| 5,953,477 | A | * | 9/1999 | Wach et al. | ................. 385/115 |
| 5,999,670 | A | * | 12/1999 | Yoshimura et al. | ........... 385/31 |
| 6,205,274 | B1 | * | 3/2001 | Zhou | ........................... 385/38 |
| 6,236,793 | B1 | * | 5/2001 | Lawrence et al. | .......... 385/132 |
| 6,530,698 | B1 | * | 3/2003 | Kuhara et al. | ................ 385/88 |
| 6,798,947 | B2 | * | 9/2004 | Iltchenko | ..................... 385/31 |
| 6,865,143 | B2 | * | 3/2005 | Yanagawa et al. | ....... 369/44.29 |
| 2001/0043387 | A1 | * | 11/2001 | Lawrence et al. | ......... 359/333 |
| 2003/0010905 | A1 | * | 1/2003 | Luo | ...................... 250/227.11 |
| 2004/0202428 | A1 | * | 10/2004 | Hwang et al. | ................ 385/49 |
| 2004/0240794 | A1 | * | 12/2004 | Heiks | .......................... 385/76 |

FOREIGN PATENT DOCUMENTS

JP 2002277691 * 3/2001

* cited by examiner

*Primary Examiner*—Brian Healy
*Assistant Examiner*—Charlie Peng
(74) *Attorney, Agent, or Firm*—Robert J. Depke; Rockey, Depke & Lyons, LLC.

(57) ABSTRACT

A half region of an end face of an optical fiber is cut at an angle of 45° to form a reflecting surface. A light-emitting element is arranged so as to face the end face of the optical fiber. A photoreceptor element is arranged beside the optical fiber with the element facing the reflecting surface. Transmitting light that has been emitted from the light-emitting element enters the end face of the optical fiber and passes through this optical fiber. Further, received light, which has been passed through the optical fiber is reflected by the reflecting surface and emitted from the side of the optical fiber, and then it enters the photoreceptor element. This allows the transmitting light and the received light to be separated from each other without using any optical component.

19 Claims, 8 Drawing Sheets

F I G. 5
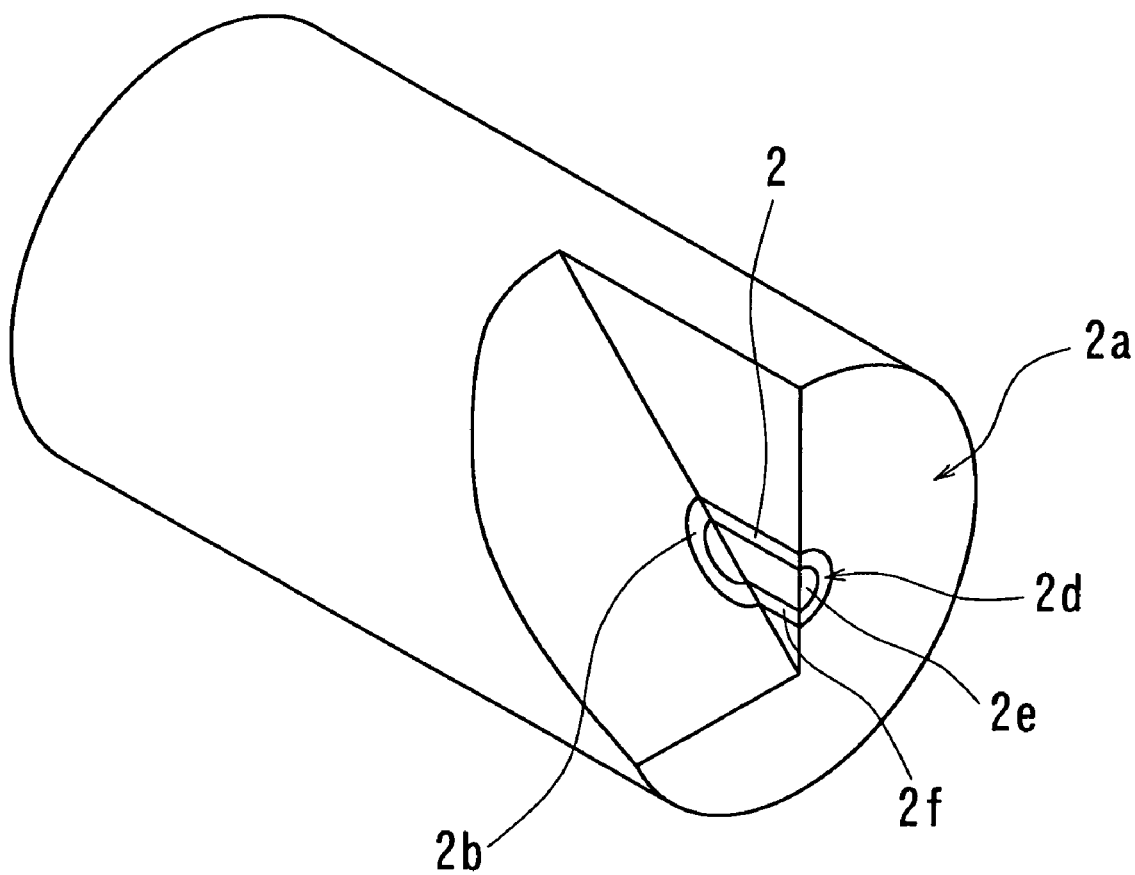

OPTICAL COMMUNICATION MODULE AND CONNECTOR

BACKGROUND OF THE INVENTION

1. Field of the Invention

The present invention relates to an optical communication module and a connector equipped with this optical communication module. More specifically, it relates to an optical communication module for single-core bi-directional communication and the like.

2. Description of Related Art

FIG. 1 is an explanatory illustration of an outlined configuration of an optical communication system for performing single-core bi-directional optical-fiber communication. This optical communication system 100 has such a configuration that optical communication modules 101 wherein each module is equipped with a light-emitting element and a photoreceptor element, are connected to each other by one optical fiber 102. When data is transmitted from one of the optical communication modules 101A to the other optical communication module 101B, the light-emitting element of the optical communication module 101A emits transmitting light. The transmitting light emitted from the light-emitting element of the optical communication module 101A is transferred through the optical fiber 102 and then, the photoreceptor element of the other optical module 101B receives it.

When data is transmitted from the other optical communication module 101B to the one optical communication module 101A, the light-emitting element of the optical communication module 101B emits transmitting light. The transmitting light emitted from the light-emitting element of the optical communication module 101B is transferred through the optical fiber 102, which is also used to transmit data from the optical communication module 101A, and then, the photoreceptor element of the other optical module 101A receives it.

Such a technology is referred to as "single-core bi-directional communication" as to thus use the same optical fiber 102 both in a case where data is transmitted from the one optical communication module 101A and received by the other optical communication module 101B and in a case where data is transmitted from the other optical communication module 101B and received by the one optical communication module 101A. In particular, a technology for performing transmission and reception simultaneously is referred to as "single-core bi-directional full-duplex communication".

It is to be noted that the optical communication module 101 for performing the single-core bi-directional communication needs to have a configuration to separate the transmitting light and the received light from each other. Conventionally, such a system is mainly used as to separate a polarized light peculiar to reflected light of the transmitting light using a beam splitter in order to separate the transmitting light and the received light from each other.

However, since the beam splitter is an expensive optical component, it is difficult to reduce costs of the communication module. Therefore, such a configuration has been suggested as to separate the transmitting light and the received light from each other using a reflecting mirror (see, for example, Japanese Patent Application Publication No. 2001-242354).

FIG. 2 is an outlined side view for showing a configuration of such a conventional optical communication module. A light-emitting element 103 is arranged along an optical axis of the optical fiber 102. Between this light-emitting element 103 and an end face of the optical fiber 102, a reflecting mirror 104 is arranged which has a transmission factor of about 50% and a reflection coefficient of about 50%. A photoreceptor element 105 is provided along a path of light reflected by the reflecting mirror 104.

In this configuration, transmitting light from the light-emitting element 103 passes through the reflecting mirror 104 and is made incident upon the optical fiber 102. Received light that has been emitted from the optical fiber 102, on the other hand, is reflected by the reflecting mirror 104 and made incident upon the photoreceptor element 105.

However, even if the configuration utilizes a reflecting mirror, it is difficult to miniaturize the optical communication module. In a case where use of an optical communication module for domestic appliances is premised, the module is required not only to be low in costs but also to be small in size. However, it is difficult to reduce costs and sizes of such a configuration as to use an optical component in order to separate optical paths, which has been a problem.

SUMMARY OF THE INVENTION

To solve these problems, the present invention has been developed, and it is an object of the present invention to provide a small sized optical communication module having a simple configuration and a connector equipped with this optical communication module.

According to the invention, an optical communication module for performing single-core bi-directional communication comprises an optical fiber, a light-emitting element for emitting transmitting light, a photoreceptor element for receiving received light. The optical fiber has an end face having an inclined part to form a reflecting surface. Any one of the light-emitting element and the photoreceptor element is arranged with one of them facing the end face of the optical fiber, and the other is arranged beside the optical fiber with it facing the reflecting surface. The photoreceptor element is arranged outside a maximum diffusion range of the light emitted from the light-emitting element.

According to the optical communication module related to the present invention, the transmitting light emitted from the light-emitting element or the received light to be received by the photoreceptor element is reflected by the reflecting surface so that the transmitting light and the received light may be separated from each other. In this case, the photoreceptor element is arranged outside a maximum diffusion range of the transmitting light emitted from the light-emitting element, to thus prevent the transmitting light from being made incident directly upon the photoreceptor element.

It is thus possible to separate the transmitting light and the received light from each other without using any optical component for separation of optical paths such as a beam splitter, thus providing a small-sized and inexpensive optical communication module. Further, it is possible to provide an optical communication module that can perform single-core bi-directional communication while suppressing crosstalk.

A whole of the end face of the optical fiber may be obliquely inclined to form the reflecting surface. The light-emitting element may be arranged with the element facing the end face of the optical fiber, and a support member for the light-emitting element may be attached to the end face of the optical fiber as abutted thereto. A support member for the photoreceptor element is attached to the support member for the light-emitting element with them being abutted.

The end face of the optical fiber may have an obliquely inclined reflecting surface. The obliquely inclined reflecting surface includes a portion of an end face of a core, which is also at least a part of the end face of the optical fiber. The reflecting surface may incline at an angle of about 45 degrees with respect to an optical axis of the fiber. A light-receiving plane normal line of the photoreceptor element is arranged at an angle of about 90 degrees with respect to an optical axis of the fiber.

A connector related to the present invention is equipped with this optical communication module. That is, this connector incorporates in it an optical communication module comprising a circuit for performing conversion between an electric signal and an optical signal, an optical fiber, a light-emitting element for emitting light, a photoreceptor element for receiving light. The optical fiber also has an end face having an inclined part to form a reflecting surface. Any one of the light-emitting element and the photoreceptor element is arranged with the one of the elements facing the end face of the optical fiber. The other is arranged beside the optical fiber with it facing the reflecting surface. The photoreceptor element is also arranged outside a maximum diffusion range of the light emitted from the light-emitting element.

According to the connector related to the present invention, the transmitting light emitted from the light-emitting element or the received light to be received by the photoreceptor element is reflected by the reflecting surface so that the transmitting light and the received light may be separated from each other. It is thus possible to separate the transmitting light and the received light from each other without using any optical component for separation of optical paths such as a beam splitter, thus providing a small-sized connector that can even perform conversion between an optical signal and an electric signal.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 5 is a perspective view for showing a configuration of an important portion of an optical fiber;

DESCRIPTION OF THE PREFERRED EMBODIMENTS

Figure 1:
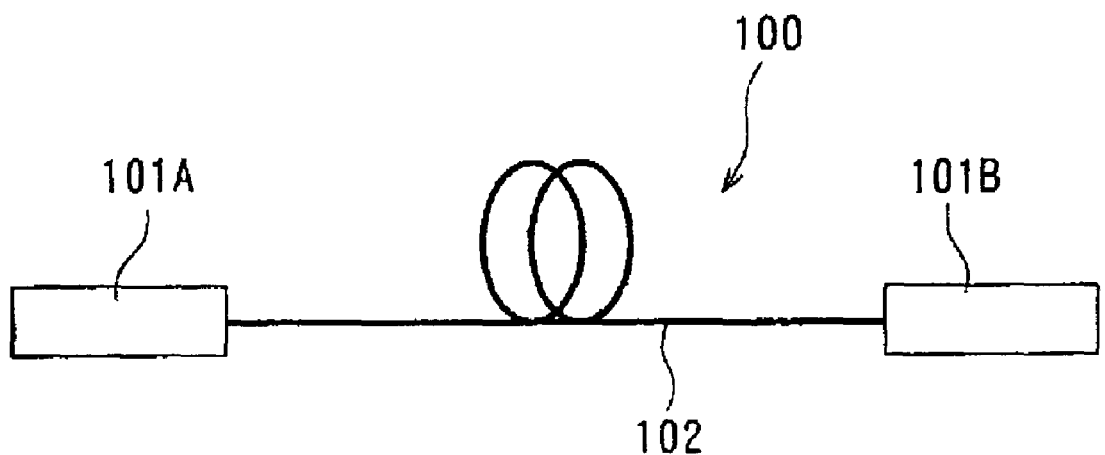
FIG. 1 is an explanatory illustration of an outlined configuration example of an optical communication system for performing single-core bi-directional optical-fiber communication.
Figure 2:
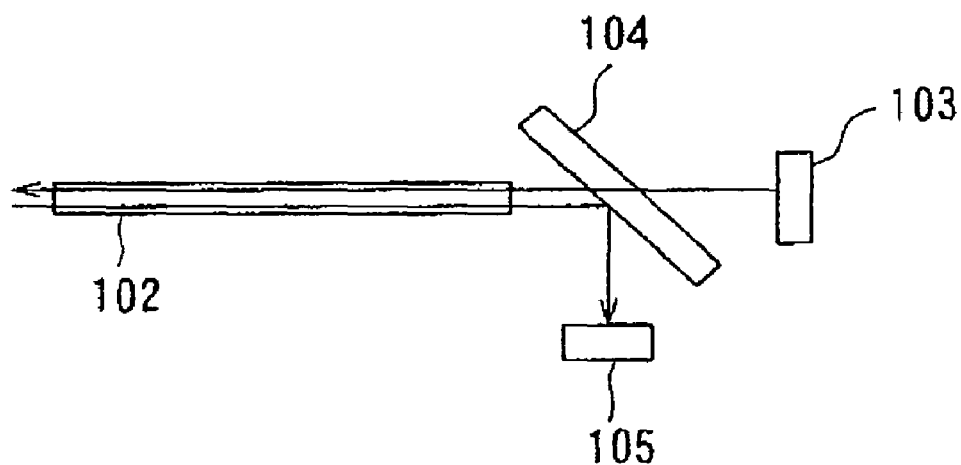
FIG. 2 is an outlined side view for showing a configuration of a conventional optical communication module.
Figure 3:
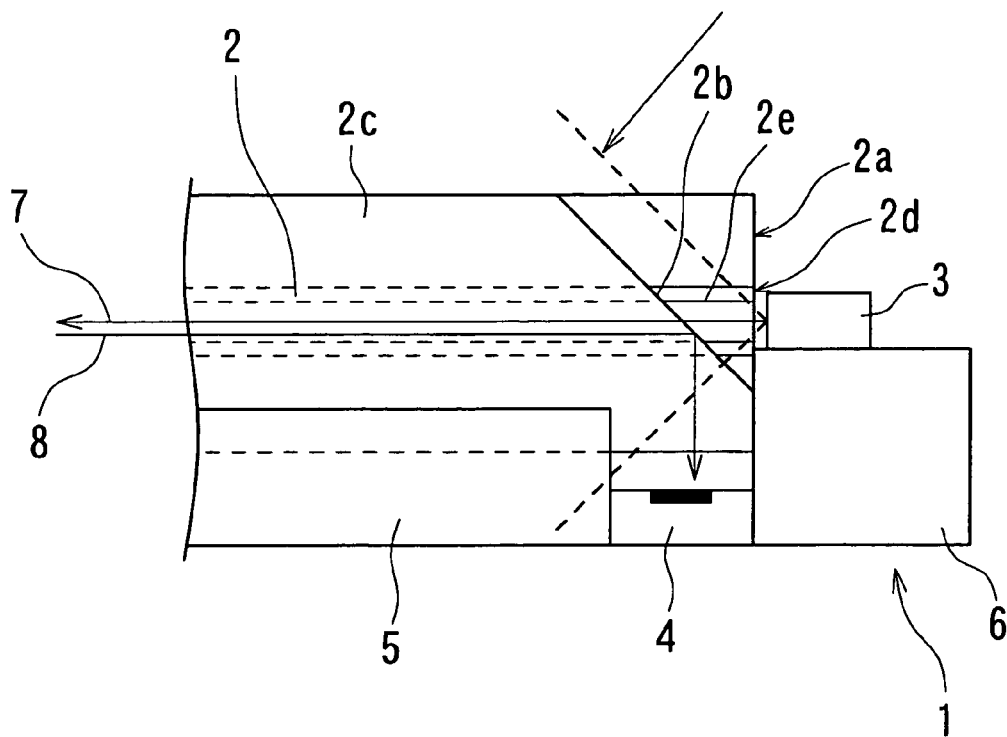
FIG. 3 is a side view for showing a configuration of an optical communication module according to an embodiment of the present invention.
Figure 4:
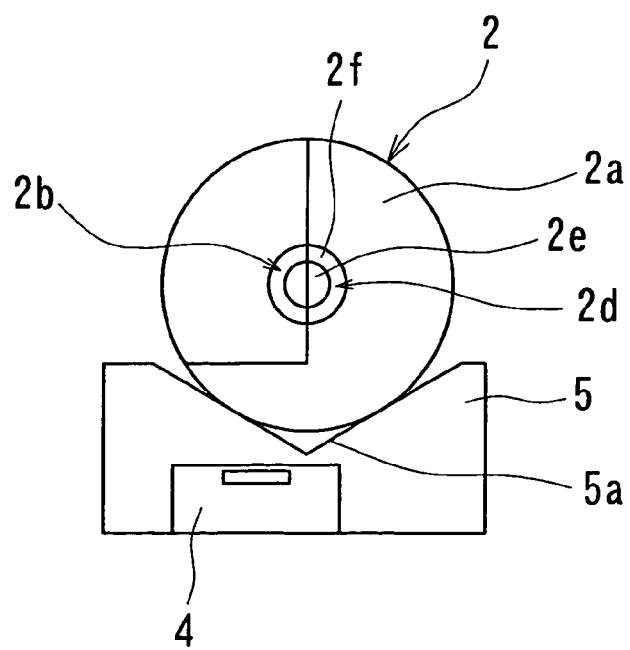
FIG. 4 is a front view of an important portion for showing the configuration of the optical communication module according to an embodiment of the present invention.

The following will describe embodiments of an optical communication module and a connector according to the present invention with reference to drawings. FIGS. 3 and 4 show a configuration of an optical communication module 1 according to the present embodiment, FIG. 3 is its side view, and FIG. 4 is a front view of its important portion. Further, FIG. 5 is a perspective view for showing a configuration of an important portion of an optical fiber 2.

The optical communication module 1 according to the present embodiment is applied to an inter-domestic-appliance communication, a local area network (LAN), a storage area network (SAN), etc. This optical communication module 1 an optical front-end module for performing full-duplex bi-directional communication by use of one optical fiber. It has a configuration such that an end face 2a of the optical fiber 2 is partially cut obliquely to form a reflecting surface 2b. The reflecting surface 2b separates the transmitting light and the received light from each other to suppress crosstalk while arranging a light-emitting element 3 and a photoreceptor 4 close to each other.

The optical fiber 2 is coated with a ferrule 2c and supported in a V-shaped groove 5a formed in a guide 5. A portion of, for example, a half region of the end face 2a of this optical fiber 2 is cut obliquely at an angle of 45° with respect to an optical axis of the optical fiber 2 to form the reflecting surface 2b.

The obliquely inclined reflecting surface 2b includes a portion of an end face in a core 2e. The portion of the end face in the core 2e is also at least a part of the end face 2a of the optical fiber 2. The term, "core" refers to a central region of the optical fiber 2 around an optical axis thereof, through which the transmitting light and the received light pass. The core has a higher refraction factor than that of the remaining region, for example, a clad 2f of the fiber 2. The clad 2f encloses the core 2e.

The light-emitting element 3 is constituted of, for example, a semiconductor laser (LD) and arranged in such a manner as to face the end face 2a of the optical fiber 2. When the light-emitting element 3 faces the end face 2a of the optical fiber 2, a side on the end face 2a of the optical fiber 2 on which the reflecting surface 2b is not provided becomes an incidence face 2d upon which the transmitting light is made incident as shown in FIG. 4.

The photoreceptor element 4 is constituted of, for example, a photo-diode (PD) and arranged as facing the reflecting surface 2b at an angle of 90° with respect to an optical axis of the optical fiber 2. The received light, which has traveled through the optical fiber 2, is reflected by the reflecting surface 2b and turned around 90 with respect to the optical axis. Therefore, the received light is emitted from the side of the optical fiber 2 and made incident upon the photoreceptor element 4. The reflecting surface 2b is formed in the half region of the optical fiber 2 as shown in FIG. 4, so that the photoreceptor element 4 is arranged as offset to the side on which the reflecting surface 2b is provided.

Note here that the reflecting surface 2b is formed by cutting a portion of the end face 2a of the optical fiber 2 and the light-emitting element 3 faces this end face 2a, so that the light-emitting element 3 and the photoreceptor element 4 are arranged close to each other.

The close arrangement manner allows the photoreceptor element 4 to be arranged outside a maximum diffusion range of the laser light from the light-emitting element 3. Since the maximum diffusion range of the laser light from the light-emitting element 3 has an angle of about 45° with respect to a light-emitting direction, by arranging the photoreceptor element 4 to an angular displacement not smaller than 45° vertically with respect to a light-emitting point, the transmitting light from the light-emitting element 3 can be prevented from being made incident upon the photoreceptor 4 directly.

The photoreceptor element 3 is mounted on a sub-mount 6 having a drive circuit. By providing such a configuration that this sub-mount 6 serving as a support member for the light-emitting element 3 and the optical fiber 2 are attached to each other in a condition where an edge of the former and the end face 2a of the latter are abutted against each other, a positional relationship between the optical fiber 2 and the light-emitting element 3 is determined uniquely. In a configuration according to the present embodiment, the end face 2a of the optical fiber 2 and a package serving as the support member for the photoreceptor element 4 are abutted against the edge of the sub-mounted 6 in attachment. Therefore, a positional relationship among the optical fiber 2, the light-emitting element 3, and the photoreceptor element 4 is determined uniquely, thus enabling improvement of an alignment accuracy and simplification of assembly work steps.

Figure 6:
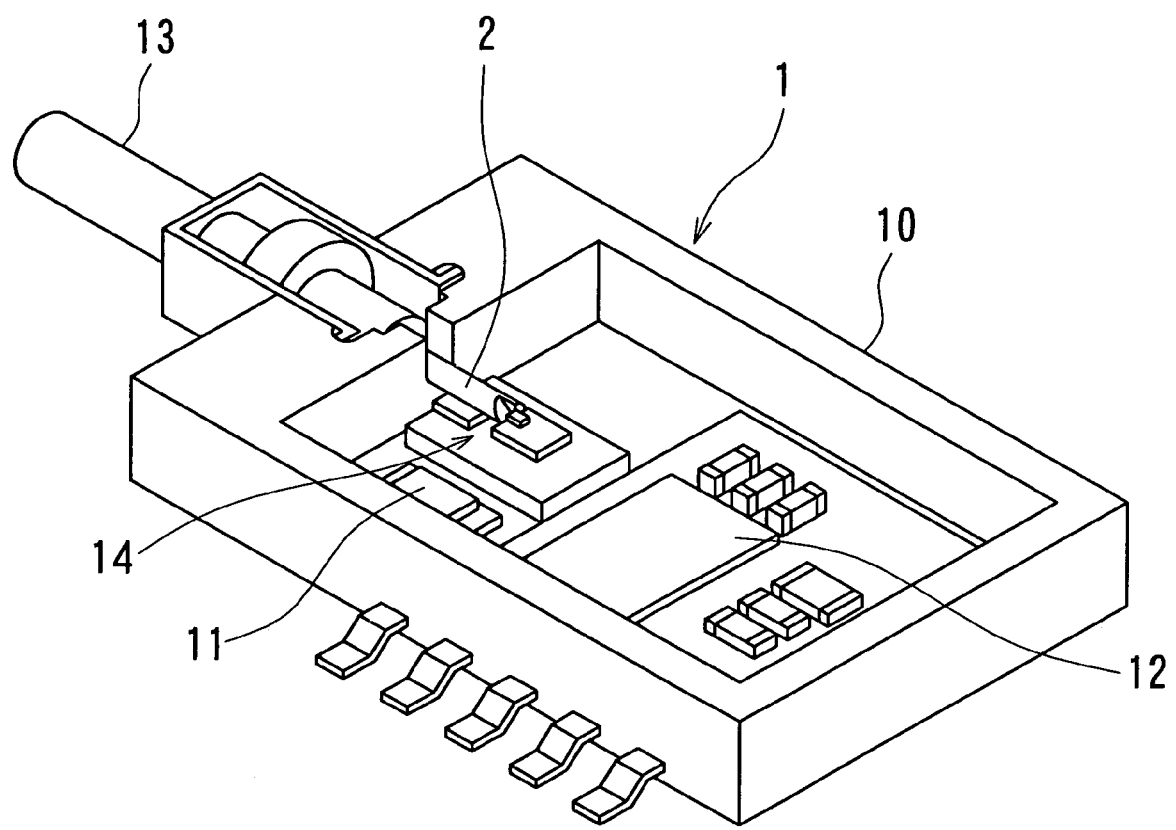
FIG. 6 is an exploded perspective view for showing an overall configuration of the optical communication module.
Figure 7:
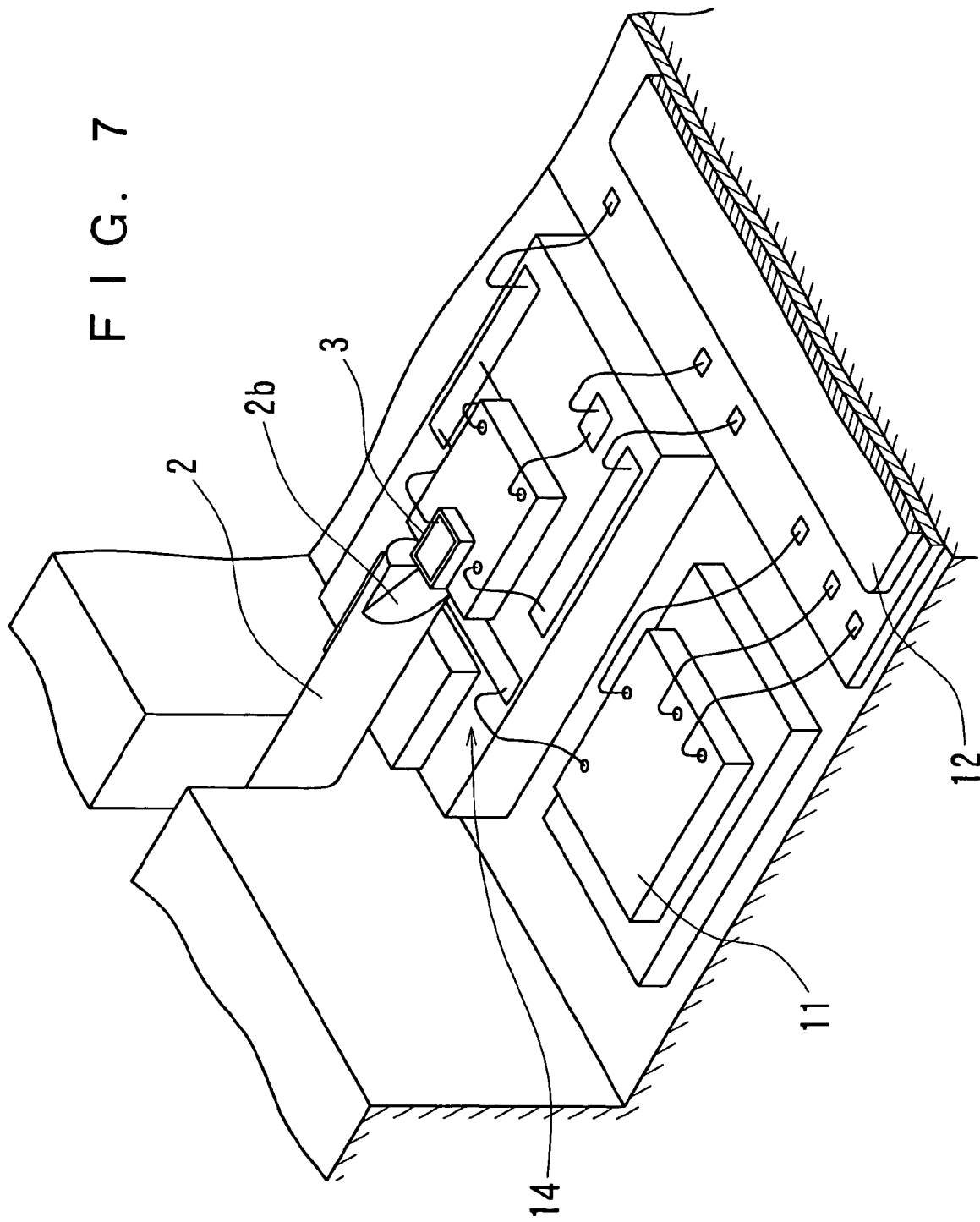
FIG. 7 is a partially broken perspective view for showing a configuration of an important portion of the optical communication module.

FIG. 6 is an exploded perspective view for showing an overall configuration of the optical communication module. FIG. 7 is a partially broken perspective view for showing a configuration of an important portion of the optical communication module 1. The optical communication module 1 is incorporated in a package 10 having, for example, a small outline package (SOP) shape. This package 10 is mounted therein with an amplification circuit 11 for converting a current into a voltage, and an integrated circuit (IC) 12, which incorporates a drive circuit for the light-emitting element 3, a signal shaping circuit, and the like. Further, it comprises, for example, a mechanism for connection of a cable 13 incorporating the optical fiber 2. This package 10 is mounted on a board (not shown) so that inter-board optical communication etc. may be performed.

Next, operations of the optical communication module 1 according to the present embodiment will be described. To send a signal, an input signal which has undergone encoding suited to bi-directional optical communication is input to the light-emitting element 3 supplied with a drive bias, thus causing the light-emitting element 3 to emit the transmitting light 7.

The transmitting light 7 emitted from the light-emitting element 3 enters the optical fiber 2 through the incidence face 2d of the end face 2a thereof. Note here that the photoreceptor element 4 is arranged outside a maximum diffusion range of the transmitting light 7, thereby preventing the transmitting light 7 which has entered the optical fiber 2 from being made incident upon the photoreceptor element 4 directly. It is thus possible to reduce crosstalk to the photoreceptor element 4 owing to the transmitting signal.

The transmitting light 7 that has entered the optical fiber 2 provides the received light 8 for the optical communication module 1, which is installed at the other end of a transmission channel constituted of the optical fiber 2, having the same configuration. That is, the received light 8 that has traveled through the optical fiber 2 and entered the optical communication module 1 is reflected by the reflecting surface 2b toward the photoreceptor element 4, emitted from the side of the optical fiber 2, and made incident upon the photoreceptor element 4. Then, the received light 8 made incident upon the photoreceptor element 4 is converted into an electric signal by a conversion circuit 14 and output.

Note here that the reflecting surface 2b can be improved in reflection efficiency by forming an evaporated film of, for example, aluminum on it. Further, it is also possible to utilize total reflection owing to a boundary face between the optical fiber 2 and air. In this case, the reflection efficiency can be adjusted on the basis of an accuracy of the reflecting surface 2b.

Further, although, in the above example, the reflecting surface 2b has been formed in the half region of the end face 2a of the optical fiber 2, a size of this reflecting surface 2b may also be changed to adjust a signal intensity of the received light. As can be seen from the above, by treating the reflecting surface 2b, it is possible to adjust an intensity of a transmitting/received signal and an S/N ratio between the signal light and noise.

Figure 8:
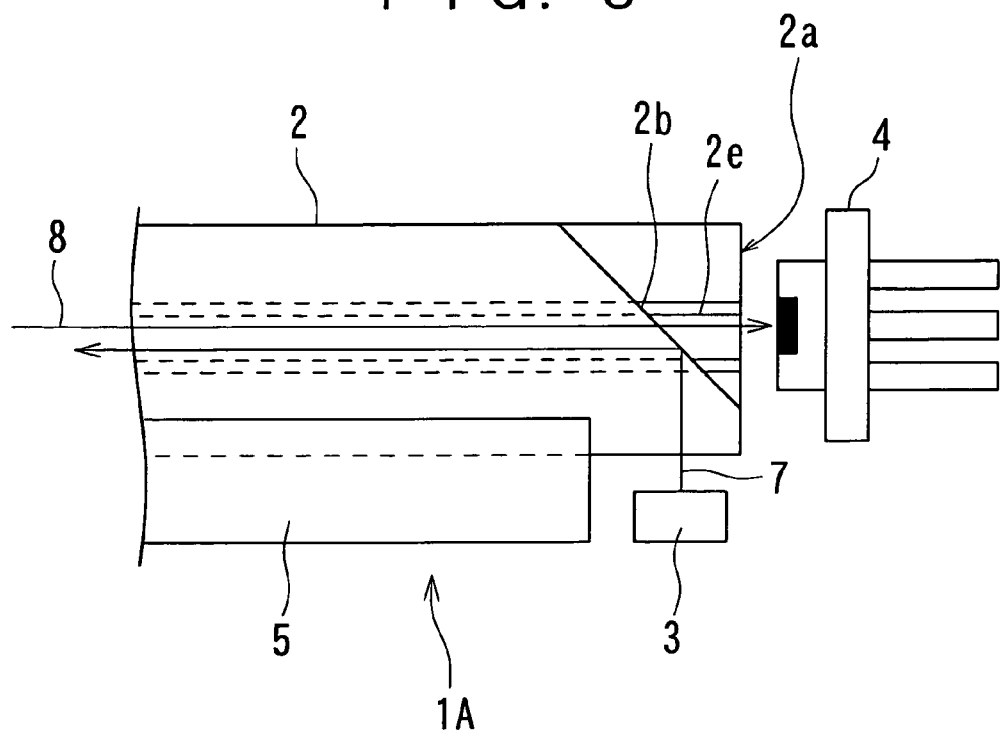
FIG. 8 is a side view for showing a variant of the optical communication module according to another embodiment of the present invention.

FIG. 8 is a side view for showing a variant of the optical communication module according to the present embodiment. An optical communication module 1A shown in FIG. 8 has such a configuration that a photoreceptor element 4 faces an end face 2a of an optical fiber 2 and a light-emitting element 3 is arranged beside the optical fiber 2 with it facing a reflecting surface 2b.

In this configuration, the transmitting light 7 emitted from the light-emitting element 3 is reflected by the reflecting surface 2b and travels through the optical fiber 2. Further, the received light 8 which has traveled through the optical fiber 2 and entered the optical communication module 1A is emitted from the end face 2a of the optical fiber 2 and enters the photoreceptor element 4.

Note here that the light-emitting element 3 may have such a configuration as to emit light at a direction parallel to a substrate on which the light-emitting element 3 is mounted. In this case, the optical communication module 1A shown in FIG. 8 needs to use a sub-mount having a mirror which turns up the transmitting light vertically. Alternatively, a surface-emitting semiconductor laser such as a vertical-cavity surface-emitting laser (VCSEL) and a prism-using surface-emitting laser as shown in FIG. 9 may be used.

Figure 9:
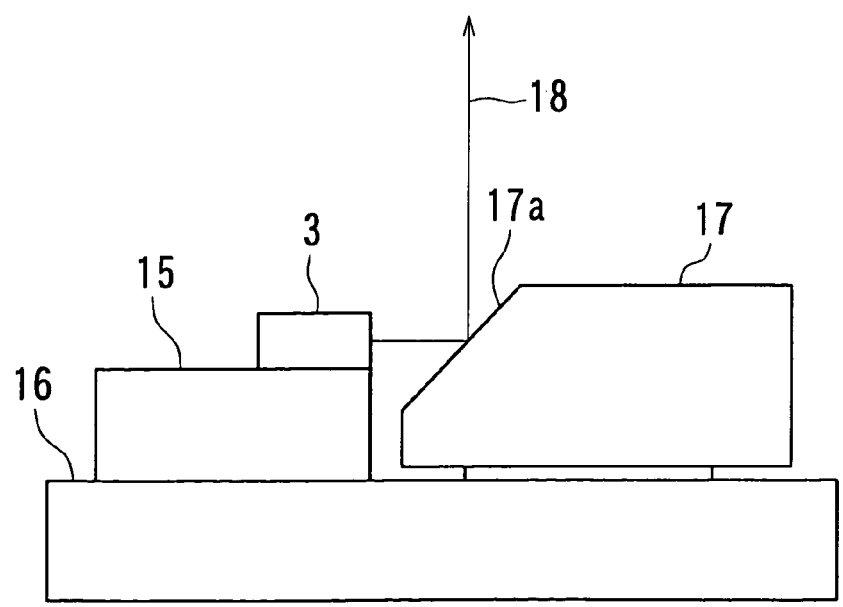
FIG. 9 is a side view for showing another surface-emitting semiconductor laser according to the present invention.

The prism-using surface-emitting laser, as shown in FIG. 9, has a light-emitting element 3 mounted on a sub-mount 15, a substrate 16 mounting the sub-mount and having required electrical wiring, and a prism 17 having an inclined surface 17a of 45 degrees, which faces the light-emitting element 3.

Transmitting light 18 emitted from the light-emitting element 3 is reflected by the inclined surface 17a of the prism 17 and travels through the optical fiber, not shown, to reach the other side thereof.

Another variant of the optical communication module according to the present embodiment may also have such a configuration, which is not shown though, that by turning the reflecting surface 2b around, the photoreceptor element 4 is arranged beside the optical fiber 2. Further, such a configuration may also be provided that the optical fiber 2 is supported not by a guide 5 having a V-shaped groove 5a therein but by using a through-hole.

The optical communication modules 1, 1A according to the present embodiment have no optical component required to separate optical paths, and they have the light-emitting element 3 and the photoreceptor element 4 arranged close to the end face 2a of the optical fiber 2 so that they can be realized to be very small. Therefore, they can be built in an existing connector.

Figure 10:
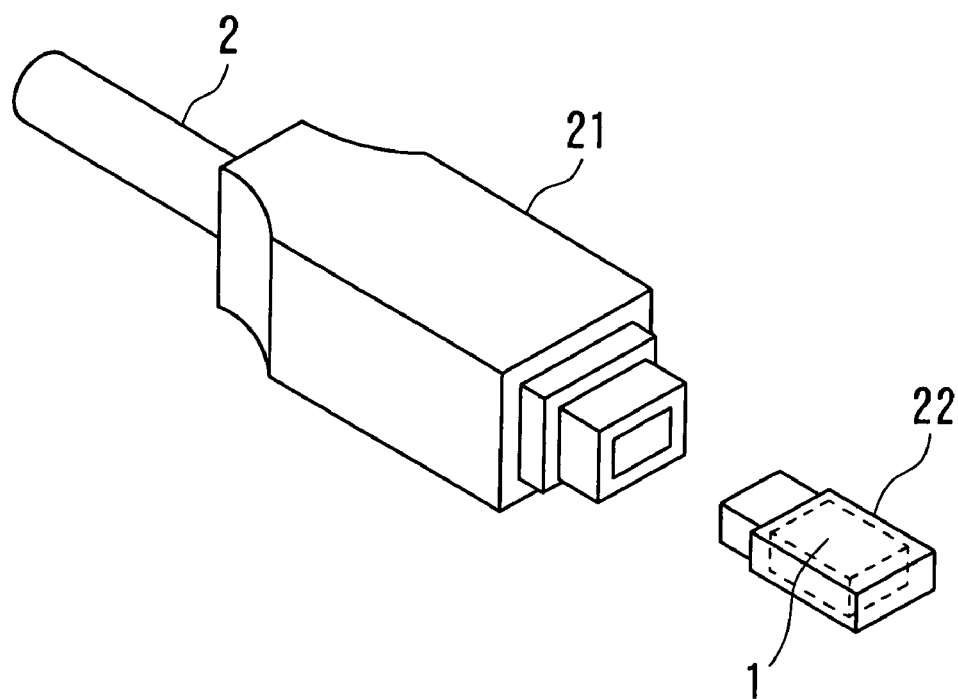
FIG. 10 is a perspective view for showing a configuration of a connector to which an optical communication module of the present invention is applied.
Figure 11:
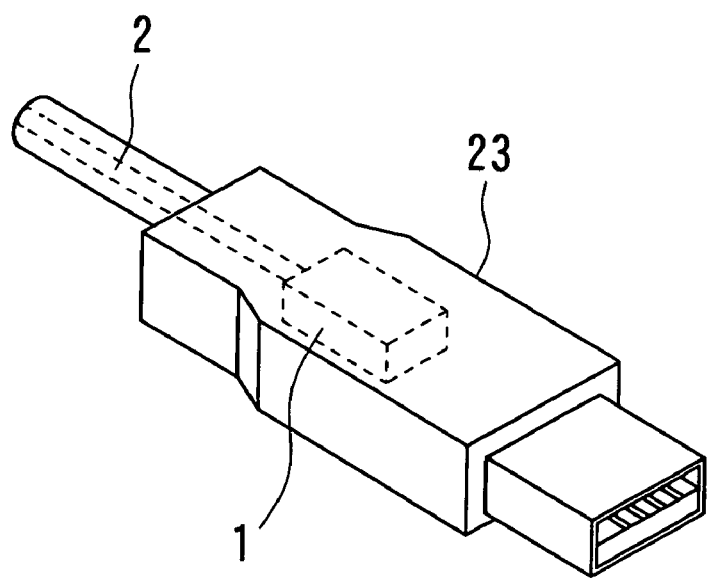
FIG. 11 is a perspective view for showing another configuration of the connector to which an optical communication module of the present invention is applied.
Figure 12:
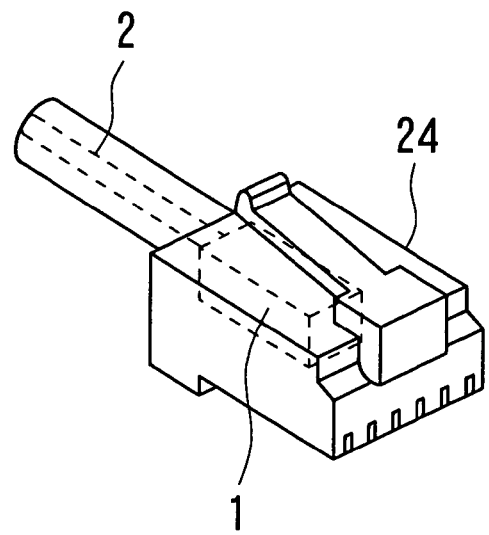
FIG. 12 is a perspective view for showing a further configuration of the connector to which an optical communication module of the present invention is applied.

FIGS. 10-12 are perspective views each for showing a configuration of a connector to which the optical communication module 1 or 1a is applied. FIG. 10 shows a case where it is applied to an existing optical connector 21. For example, if a board-side optical connector 22 which is used as paired with the optical connector 21 is constituted of the optical communication module 1, the board can be miniaturized.

FIG. 11 shows a case where it is applied to a universal serial bus (USB) connector 23. The optical communication module 1 or 1a according to the present embodiment is realized to have such a size as to be incorporated in the USB connector 23. By thus incorporating the optical communication module 1 in the USB connector 23, it is possible to perform conversion between an optical signal and an electric signal in the USB connector 23, thus connecting existing devices to each other over optical wiring and realizing single-core bi-directional full-duplex communication.

FIG. 12 shows a case where the optical communication module 1 or 1a is applied to a modular connector 24. The optical communication module 1 according to the present embodiment is realized to have such a size as to be incorporated in the modular connector 24. By thus incorporating the optical communication module 1 in the modular connector 24, it is possible to perform conversion between an optical signal and an electric signal in the modular connector 24, thus similarly connecting existing devices to each other over optical wiring and realizing single-core bi-directional full-duplex communication.

Figure 13:
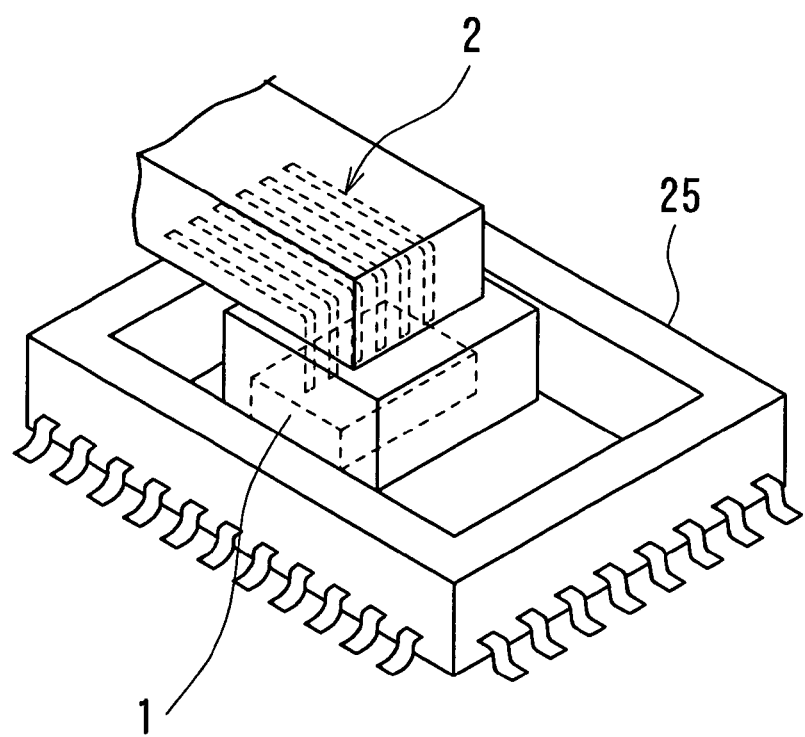
FIG. 13 is a perspective view for showing an application example of the optical communication module.

Further, the optical communication module 1 or 1a according to the present embodiment can be realized very small as described above and so can be incorporated in an IC chip. FIG. 13 is a perspective view for showing an application example of the optical communication module 1, in which FIG. 12 it is applied to an IC chip 25. The optical communication module 1 according to the present embodiment is realized to have such a size as to be incorporated in the IC chip 25 of a quad flat package (QFP) type. By thus incorporating the optical communication module 1 in the IC chip 25, it is possible to perform conversion between an optical signal and an electric signal in the IC chip 25, thus directly connecting, for example, IC chips, not shown, by using an optical fiber and realizing single-core bi-directional full-duplex communication. Furthermore, depending on the size of the IC chip 25, it is also possible to mount in the IC chip 25 an optical communication module in which the light-emitting element and the photoreceptor element are arranged in such a manner as to match the multi-core optical fiber 2, thus accommodating mass-capacity communication.

As described above, according to the embodiments of the present invention, the optical communication modules may separate the transmitting light and the received light from each other without using any optical component for separation of optical paths such as a beam splitter, thus providing a small-sized and inexpensive optical communication module. Further, they can provide an optical communication module that can perform single-core bi-directional communication while suppressing crosstalk.

Further, the connector related to the present invention is equipped with the above-mentioned optical communication module so that it may have a small size while having a function to perform conversion between an optical signal and an electric signal.

Thus has been described an optical communication module or the like for performing single-core bi-directional communication and a connector incorporating such an optical communication module. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An optical communication module for performing single-core bi-directional communication, comprising:
an optical fiber;
a light-emitting element for emitting light; and
a photoreceptor element for receiving light,
wherein said optical fiber has an end face at one end, said end face having an angled portion forming a reflecting surface;
wherein either one of said light-emitting element and said photoreceptor element is arranged adjacent to an end of the fiber along an axis of light propagation and faces said end face of said optical fiber, and the other of said light-emitting element and said photoreceptor element is arranged adjacent an outer surface of said optical fiber in a radial direction from the center of the optical fiber and faces said reflecting surface; and wherein said photoreceptor element is arranged outside a maximum diffusion range of the light emitted from said light-emitting element, and
wherein said end face of said optical fiber further includes a non-angled portion.

2. An optical communication module according to claim 1, wherein said angled portion includes a portion of an end face of a core of said optical fiber.

3. An optical communication module according to claim 2, wherein said photoreceptor is arranged adjacent an outer surface of said optical fiber in a radial direction from the center of the optical fiber and faces the reflecting surface and is positioned along said outer surface such that the photoreceptor is substantially beneath the angled portion of the end face of said optical fiber.

4. An optical communication module according to claim 1, wherein said angled portion of the end face of said optical fiber further includes a film formed over a surface thereof for improving the reflecting efficiency of the reflecting surface, and further wherein the non-angled portion of the end face does not include such a film.

5. The optical communication module according to claim 1, wherein the photoreceptor element is arranged outside a maximum geometric diffusion range of the light emitted from said light-emitting element, irrespective of any intervening light-blocking or light-redirecting materials.

6. The optical communication module according to claim 1, wherein there is no material within the portion of the geometric diffusion range of the light emitted from said light-emitting element between the light emitting element and the photoreceptor that physically prevents light emitted from the light emitting element from reaching the photoreceptor.

7. The optical communication module according to claim 1, wherein there is no additional optical fiber located between said end face of said optical fiber and said either one of said light-emitting element and said photoreceptor element, and there is no additional optical fiber located between said outer surface of said optical fiber and said other of said light-emitting element and said photoreceptor element.

8. The optical communication module according to claim 2, wherein said angled portion of the end face of said optical fiber substantially bisects the core.

9. The optical communication module according to claim 1, wherein said photoreceptor element is offset from a center position relative to the optical fiber and towards the angled portion of the optical fiber.

10. A connector incorporating an optical communication module, said optical communication module comprising:
 a circuit for performing conversion between an electric signal and an optical signal;
 an optical fiber;
 a light-emitting element for emitting light; and
 a photoreceptor element for receiving light,
 wherein said optical fiber has an end face at one end, said end face having an inclined part to form a reflecting surface;
 wherein either one of said light-emitting element and said photoreceptor element is arranged adjacent to an end of the fiber along an axis of light propagation and faces said end face of said optical fiber, and the other of said fight-emitting element and said photoreceptor element is arranged adjacent an outer surface of said optical fiber in a radial direction from the center of the optical fiber and faces said reflecting surface; and
 wherein said photoreceptor element is arranged outside a maximum diffusion range of the Light emitted from said light-emitting element, and
 wherein said end face of said optical fiber further includes a non-angled portion.

11. A connector incorporating an optical communication module according to claim 10, wherein said angled portion includes a portion of an end face of a core of said optical fiber.

12. A connector incorporating an optical communication module according to claim 11, wherein said photoreceptor is arranged adjacent an outer surface of said optical fiber in a radial direction from the center of the optical fiber and faces the reflecting surface and is positioned along said outer surface such that the photoreceptor is substantially beneath the angled portion of the end face of said optical fiber.

13. A connector incorporating an optical communication module according to claim 10, wherein said angled portion of the end face of said optical fiber further includes a film formed over a surface thereof for improving the reflecting efficiency of the reflecting surface, and further wherein the non-angled portion of the end face does not include such a film.

14. The connector incorporating an optical communication module according to claim 10, wherein the photoreceptor element is arranged outside a maximum geometric diffusion range of the light emitted from said light-emitting element, irrespective of any intervening light-blocking or light-redirecting materials.

15. The connector incorporating an optical communication module according to claim 10, wherein there is no material within the portion of the geometric diffusion range of the light emitted from said light-emitting element between the light emitting element and the photoreceptor that physically prevents light emitted from the light emitting element from reaching the photoreceptor.

16. The connector incorporating an optical communication module according to claim 10, wherein there is no additional optical fiber located between said end face of said optical fiber and said either one of said light-emitting element and said photoreceptor element, and there is no additional optical fiber located between said outer surface of said optical fiber and said other of said light-emitting element and said photoreceptor element.

17. The connector incorporating an optical communication module according to claim 11, wherein said angled portion of the end face of said optical fiber substantially bisects the core.

18. The connector incorporating an optical communication module according to claim 10, wherein said photoreceptor element is offset from a center position relative to the optical fiber and towards the angled portion of the optical fiber.

19. An optical communication module for performing single-core bi-directional communication, comprising:
 an optical fiber;
 a light-emitting element for emitting light; and
 a photoreceptor element for receiving light,
 wherein said optical fiber has an end face at one end, said end face having an angled portion forming a reflecting surface;
 wherein either one of said light-emitting element and said photoreceptor element is arranged adjacent to an end of the fiber along an axis of light propagation and faces said end face of said optical fiber, and the other of said light-emitting element and said photoreceptor element is arranged adjacent an outer surface of said optical fiber in a radial direction from the center of the optical fiber and faces said reflecting surface; and wherein said photoreceptor element is arranged outside a maximum diffusion range of the light emitted from said light-emitting element.

* * * * *